(12) United States Patent
Preisler et al.

(10) Patent No.: US 9,364,975 B2
(45) Date of Patent: Jun. 14, 2016

(54) METHOD OF MOLDING COMPOSITE PLASTIC SHEET MATERIAL TO FORM A COMPRESSION MOLDED, DEEP-DRAWN ARTICLE

(75) Inventors: Darius J. Preisler, Macomb, MI (US); Christopher A. Heikkila, Washington Township, MI (US)

(73) Assignee: Global IP Holdings, LLC, Sterling Heights, MI (US)

(*) Notice: Subject to any disclaimer, the term of this patent is extended or adjusted under 35 U.S.C. 154(b) by 658 days.

(21) Appl. No.: 13/606,430

(22) Filed: Sep. 7, 2012

(65) Prior Publication Data

US 2014/0070458 A1   Mar. 13, 2014

(51) Int. Cl.
| | |
|---|---|
| *B29C 44/02* | (2006.01) |
| *B29C 43/36* | (2006.01) |
| *B29C 51/00* | (2006.01) |
| *B29C 51/26* | (2006.01) |
| *B29L 31/30* | (2006.01) |
| *B29C 51/08* | (2006.01) |
| *B29K 105/12* | (2006.01) |

(52) U.S. Cl.
CPC .............. *B29C 43/36* (2013.01); *B29C 51/002* (2013.01); *B29C 51/262* (2013.01); *B29C 51/082* (2013.01); *B29C 2793/009* (2013.01); *B29K 2105/12* (2013.01); *B29L 2031/3005* (2013.01); *B29L 2031/3008* (2013.01)

(58) Field of Classification Search
CPC ...... B29C 51/08; B29C 43/36; B29C 51/262; B29C 51/002; B29C 2793/009; B29C 51/082; B29L 2031/3008; B29L 2031/3005; B29K 2105/12

USPC .................................................. 264/161, 257
See application file for complete search history.

(56) References Cited

U.S. PATENT DOCUMENTS

| | | | |
|---|---|---|---|
| 2,666,951 A | * | 1/1954 | Grove et al. ................... 264/544 |
| 3,600,746 A | * | 8/1971 | Kostur .................. B29C 51/262 26/1 |
| 4,393,020 A | | 7/1983 | Li et al. |
| 4,866,117 A | | 9/1989 | Egashira et al. |
| 5,153,241 A | | 10/1992 | Beshay |
| 5,199,595 A | * | 4/1993 | Muggli ................. B29C 51/085 220/62.11 |
| 5,290,167 A | | 3/1994 | Tanaka et al. |
| 5,431,871 A | | 7/1995 | Tanaka et al. |
| 5,529,826 A | * | 6/1996 | Tailor et al. .................... 428/110 |
| 6,280,551 B1 | | 8/2001 | Hilligoss |
| 6,682,675 B1 | | 1/2004 | Vandangeot et al. |
| 6,682,676 B1 | | 1/2004 | Renault et al. |

(Continued)

*Primary Examiner* — Galen Hauth
(74) *Attorney, Agent, or Firm* — Brooks Kushman P.C.

(57) ABSTRACT

A method of molding composite plastic sheet material to form a compression molded, deep-drawn article is provided. The method includes placing a heated blank of moldable, composite plastic sheet material over a female die having an article-defining cavity defined by inner surfaces of the die so that the heated blank has a predetermined position and orientation over the cavity. Then an inner portion of the heated blank is forced into the cavity along a substantially vertical axis and against the inner surfaces of the die to obtain deep-drawn material. Outer peripheral portions of the heated blank adjacent the cavity are controllably held with corresponding predetermined holding forces based on the size and shape of the article to resist movement of the outer peripheral portions towards the cavity during the step of forcing wherein the deep-drawn material controllably stretches during the step of forcing without wrinkling, tearing or ripping.

27 Claims, 3 Drawing Sheets

(56) References Cited

U.S. PATENT DOCUMENTS

| | | |
|---|---|---|
| 6,790,026 B2 | 9/2004 | Vandangeot et al. |
| 6,843,525 B2 | 1/2005 | Preisler |
| 6,890,023 B2 | 5/2005 | Preisler et al. |
| 6,981,863 B2 * | 1/2006 | Renault et al. ............... 425/510 |
| 7,431,980 B2 | 10/2008 | Woodman et al. |
| 2004/0113329 A1 * | 6/2004 | Martin ................. B29C 51/04 264/547 |
| 2008/0032094 A1 | 2/2008 | Raghavendran et al. |
| 2009/0039556 A1 * | 2/2009 | Sawada ............... B29C 51/082 264/319 |
| 2009/0242104 A1 | 10/2009 | Watanabe |
| 2010/0116407 A1 * | 5/2010 | Brentrup ............. B29C 70/506 156/62.4 |

* cited by examiner

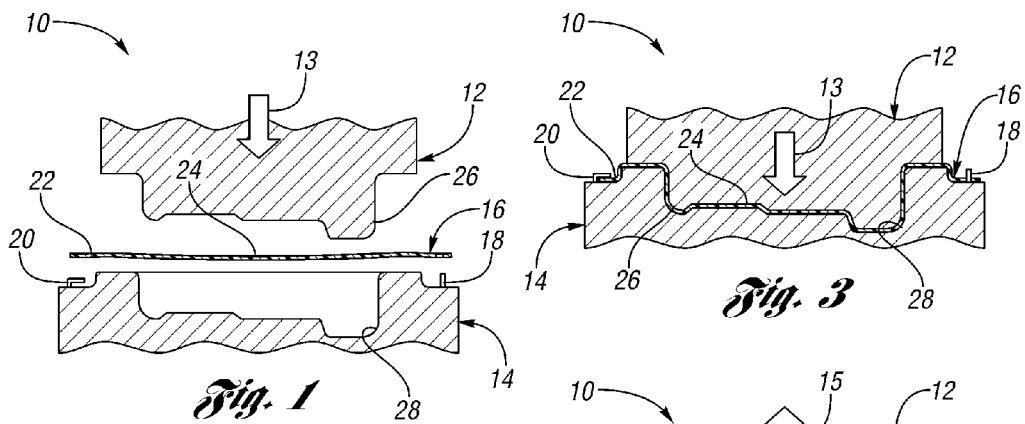
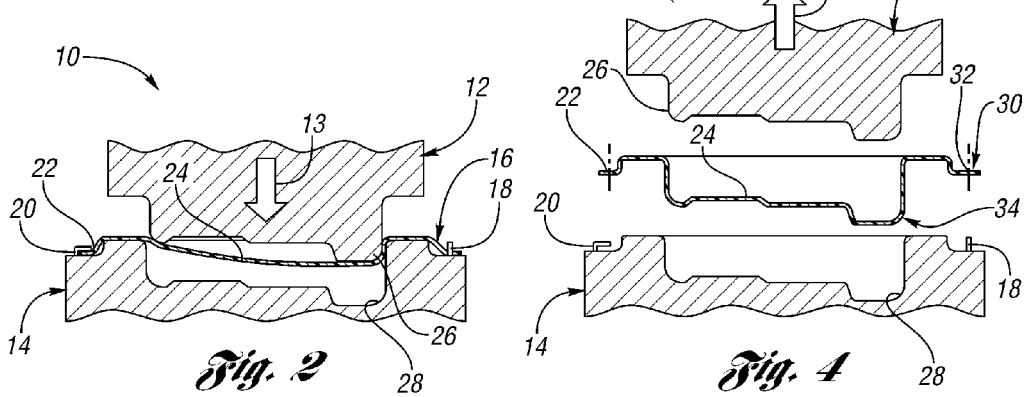
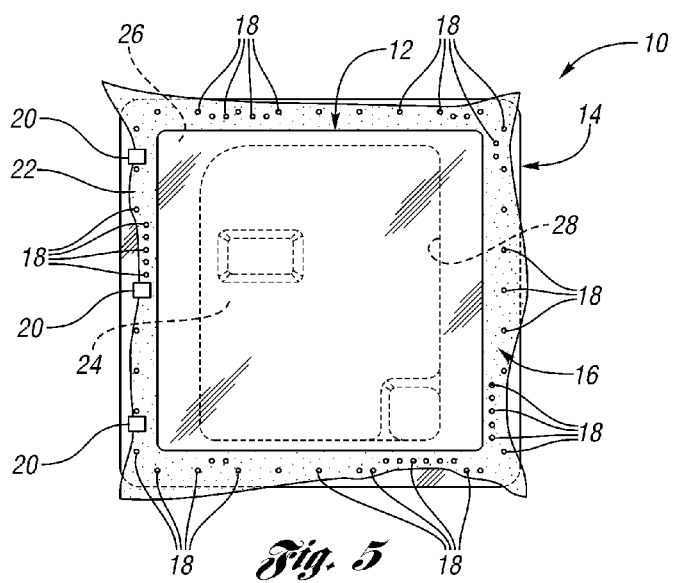

METHOD OF MOLDING COMPOSITE PLASTIC SHEET MATERIAL TO FORM A COMPRESSION MOLDED, DEEP-DRAWN ARTICLE

TECHNICAL FIELD

This invention generally relates to methods of molding composite plastic sheet material to form deep-drawn composite articles and, in particular, to methods of compression molding composite plastic sheet material to form compression molded, deep-drawn articles such as automotive articles.

OVERVIEW

Advanced composite plastics such as thermoplastics can be compression molded with unidirectional tapes, woven fabrics, randomly oriented fiber mat or chopped strand. The advantage of compression molding is its ability to mold large, fairly intricate parts. Also, it is one of the lowest cost molding methods compared with other molding methods such as transfer molding and injection molding; moreover it wastes relatively little material, giving it an advantage when working with expensive compounds. This method of molding is largely used in manufacturing automotive parts such as hoods, fenders, scoops, spoilers, as well as smaller more intricate parts. The material to be molded is positioned in the mold cavity and the heated platens are closed by a hydraulic ram. Bulk molding compound (BMC) or sheet molding compound (SMC), are conformed to the mold form by the applied pressure and heated until the curing reaction occurs. SMC feed material usually is cut to conform to the surface area of the mold. The mold is then cooled and the part removed. Materials may be loaded into the mold either in the form of pellets or sheet, or the mold may be loaded from a plasticating extruder. Materials are heated above their melting points, formed and cooled. The more evenly the feed material is distributed over the mold surface, the less flow orientation occurs during the compression stage.

Thermoplastic matrices are commonplace in mass production industries e.g. automotive applications where the leading technologies are Long Fibre reinforced Thermoplastics (LFT) and Glass fiber Mat reinforced Thermoplastics (GMT).

Deep drawing is a sheet material forming process in which a sheet material blank is radially drawn into a forming die by the mechanical action of a punch. It is thus a shape transformation process with material retention. The process may be considered "deep" drawing when the depth of the drawn part exceeds its diameter. This is achieved by redrawing the part through a series of dies especially when the material is a metal. The flange region (sheet material in the die shoulder area) experiences a radial drawing stress and a tangential compressive stress due to the material retention property. These compressive stresses (hoop stresses) result in flange wrinkles (wrinkles of the first order). Wrinkles can be prevented by using a blank holder, the function of which is to facilitate controlled material flow into the die radius.

U.S. Pat. No. 6,682,676 discloses a method and system for molding thermoplastic sandwich material to form a deep-drawn article utilizing a clamping technique and mechanism. The method includes the steps of positioning a blank of thermoplastic sandwich material having a cellular core over a female die having an article-defining cavity defined by inner surfaces of the female die. Then, an inner portion of the blank is forced into the female die along a substantially vertical axis and against the inner surfaces of the female die to obtain deep-drawn material. During the step of forcing at least one outer portion of the blank immediately adjacent the female die is clamped to guide the at least one outer portion of the blank to travel into the article-defining cavity at an acute angle with respect to the vertical axis. Thickness of at least one side wall of the deep-drawn material is substantially the same as thickness of the blank of thermoplastic sandwich material. The deep-drawn material does not significantly stretch or tear during the step of forcing due to the clamping technique and mechanism.

Other related U.S. patent documents, include U.S. Pat. Nos. 6,682,675; 7,431,980, 4,393,020; 4,866,117; 5,153,241; 5,290,167; 5,431,871; 6,790,026; 6,843,525; 6,890,023; 6,981,863; 2009/0242104 and 2008/0032094.

Driven by a growing demand by industry, governmental regulatory agencies and consumers for durable and inexpensive products that are functionally comparable or superior to metal products, a continuing need exists for improvements in composite articles subjected to difficult service conditions. This is particularly true in the automotive industry where developers and manufacturers of articles for automotive applications must meet a number of competing performance specifications for such articles.

For example, automotive interior parts exposed to direct sunlight, such as instrument panels, front and rear pillar trims, parcel shelves or package trays under or around the front and the back windshield, tend to experience extremely high surface heating when such vehicles are parked in non-shaded areas and during the summer months in many parts of the world. The exposed surfaces of the automotive interior parts are known to reach temperatures in excess of 100° C., especially in tropical and equatorial regions of the world. Many automobile OEMs have specified stringent performance requirements to address the durability of automotive interior parts exposed to such high service temperatures.

In an effort to address these demands, a number of composite materials have been developed, including glass mat thermoplastic (GMT) composites. GMT composites provide a number of advantages, e.g., they can be molded and formed into a variety of suitable products both structural and non-structural, including, among many others, automotive bumpers, interior headliners, and interior and exterior trim parts. The traditional GMT used in exterior structural application are generally compression flow molded and are substantially void free in their final part shape.

Low density GMT (LD-GMT) used in the interior trim applications are generally semi-structural in nature and are porous and light weight with densities ranging from 0.1 to 1.8 g/cm$^3$ and containing 5% to 95% voids distributed uniformly through the thickness of the finished part.

Problems associated with the prior art is that prior art, mass-produced, injection molded or vacuum formed parts are heavy, suffer from appearance problems and don't have desirable acoustic properties.

SUMMARY OF EXAMPLE EMBODIMENTS

An object of at least one embodiment of the present invention is to provide a method for compression molding composite plastic sheet material to form a deep-drawn article wherein the deep-drawn material controllably stretches without wrinkling, tearing or ripping.

Another object of at least one embodiment of the present invention is to provide a method for compression molding composite plastic sheet material to form a deep-drawn, light weight article having excellent appearance and acoustical properties wherein the articles are produced at a relatively low cost and high volume (i.e. low cycle time) by utilizing a single stamping step.

In carrying out the above objects and other objects of the present invention, a method of molding composite plastic sheet material to form a compression molded, deep-drawn article is provided. The method includes placing a heated blank of moldable, composite plastic sheet material over a female die having an article-defining cavity defined by inner surfaces of the female die so that the heated blank has a predetermined position and orientation over the article-defining cavity. The method also includes forcing an inner portion of the heated blank into the article-defining cavity along a substantially vertical axis and against the inner surfaces of the female die to obtain deep-drawn material. The method further includes controllably holding outer peripheral portions of the blank adjacent the article-defining cavity with corresponding predetermined holding forces based on size and shape of the article to resist movement of the peripheral outer portions towards the article-defining cavity during the step of forcing wherein the deep-drawn material controllably stretches during the step of forcing without wrinkling, tearing or ripping. The method finally includes removing the deep-drawn material from the female die and removing any excess material from the periphery of the deep-drawn material to form the deep-drawn article.

The step of holding may be performed with variable biasing forces which increase during the step of forcing.

The holding forces may be applied on the first outer peripheral portion of the blank outside of the cavity so that a first biasing force is initially applied to a first outer peripheral portion of the blank to allow the inner portion of the blank to travel into the cavity and a second biasing force larger than the first biasing force is later applied on the first outer peripheral portion of the blank outside of the cavity as the inner portion of the blank travels into the cavity.

The step of holding may be performed at a plurality of spaced, outer peripheral portions of the blank adjacent the article-defining cavity.

The step of forcing may be performed in a single stamping stage.

The composite plastic sheet material may include a plurality of discontinuous fibers dispersed within a thermoplastic resin.

The thermoplastic resin may be selected from polyolefins, thermoplastic polyolefin blends, polyvinyl polymers, diene polymers, polyamides, polyesters, polycarbonates, polyestercarbonates, styrene-containing polymers, acrylic polymers, polyimides, polylphenylene ether, polyphenylene oxide, polyphenylenesulphide, polyethers, polyetherketones, polyacetals, polyurethanes, polybenzimidazole, and copolymers or mixtures thereof.

The fibers may be selected from glass fibers, carbon fibers, synthetic organic fibers, natural fibers, mineral fibers, metal and/or metalized or coated fibers, or mixtures thereof.

The fibers may be selected from glass fibers, carbon fibers, polyaramid fibers, polyester fibers, nylon fibers, hemp fibers, sisal fibers, basalt fibers, steel fibers, aluminum fibers, copper fibers, zinc fibers, or mixtures thereof.

The composite sheet material may have a porosity between about 5% to about 95% by volume and an areal density of from about 400 $g/m^2$ to about 4000 $g/m^2$.

The fiber content may be from about 20% to about 80% by weight of the thermoplastic resin.

Bottom and side walls of the article may have a thickness in a range of 1 mm to 5 mm.

The article may be an automotive article.

Other technical advantages will be readily apparent to one skilled in the art from the following figures, descriptions and claims. Moreover, while specific advantages have been enumerated, various embodiments may include all, some or none of the enumerated advantages.

BRIEF DESCRIPTION OF THE DRAWINGS

FIG. 1 is a side view, partially broken away and in cross section, of a compression molding apparatus or system in its open position with a heated blank of moldable, composite plastic sheet material positioned over an article-defining cavity of a female die of the system;

FIG. 2 is a view similar to the view of FIG. 1 with a male die of the system moving towards the female die just after contact with the heated blank;

FIG. 3 is a view similar to the views of FIGS. 1 and 2 with the system in its completely closed position thereby forming deep-drawn material between the dies;

FIG. 4 is a view similar to the views of FIGS. 1-3 with the system again in its open position and showing the deep-drawn material prior to removing any excess material to form the deep-drawn article;

FIG. 5 is a top plan view of the deep-drawn material in the female die and stretched by the male die and illustrating various holding devices as well as different outer peripheral portions which are controllably stretched to a greater or lesser extent based on the size and shape of the resulting deep-drawn article;

DETAILED DESCRIPTION OF EXAMPLE EMBODIMENTS

Figure 6:
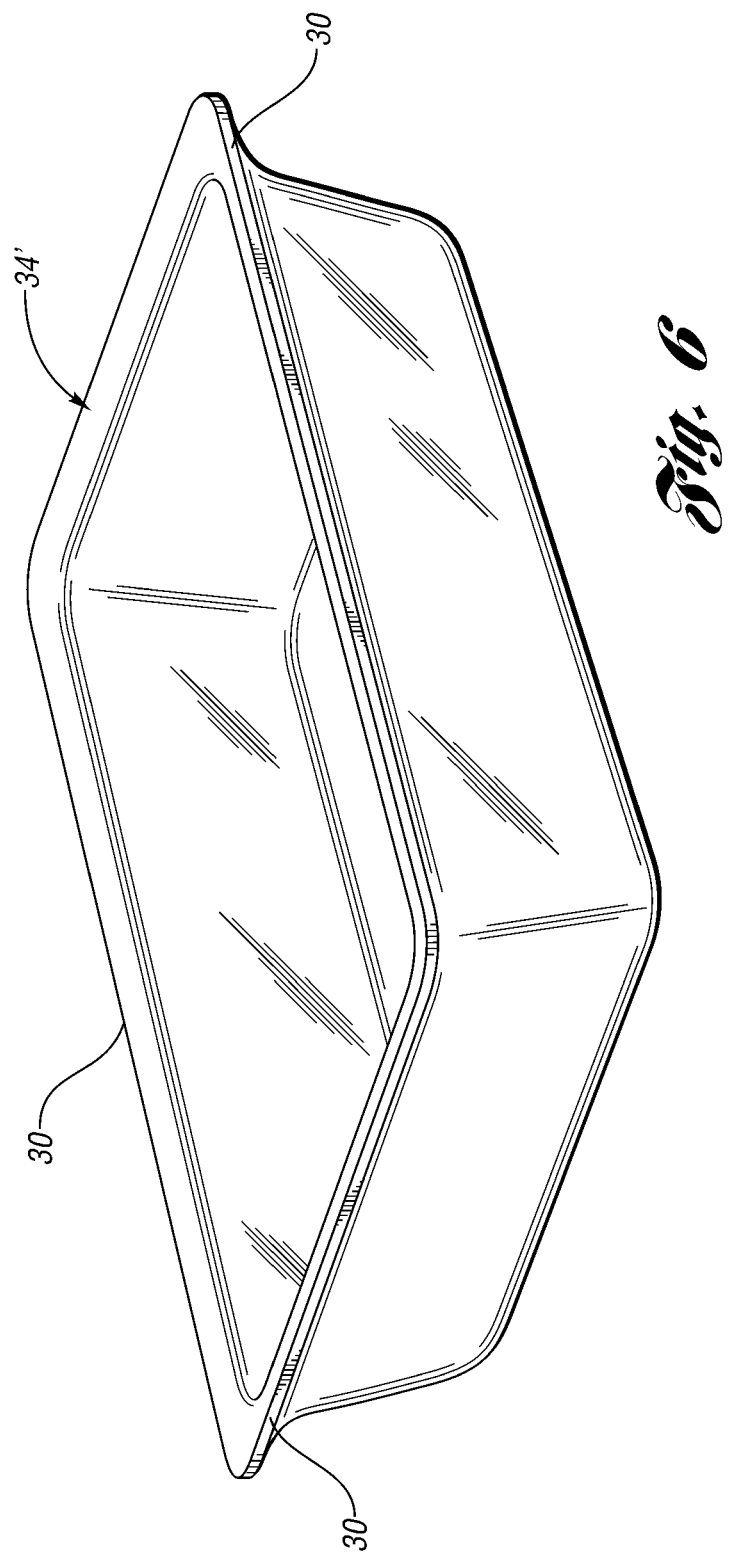
FIG. 6 is a schematic perspective view of a deep-drawn article made in accordance with at least one example embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, at least one embodiment of the present invention deals with the development of a new method of molding composite plastic sheet material to form a compression molded, deep-drawn article. The sheet material may be porous, fiber-reinforced thermoplastic sheet material. The method of the at least one embodiment allows one to mold heated blanks of moldable, plastic sheet material with a deep-draw and with a cost and cycle time that can be used for automotive and other high volume applications. The technique of the present invention is somewhat similar to that used for steel stamping. However, the method of the present invention requires only a single stamping step or stage.

The composite thermoplastic sheet material preferably comprises a plurality of discontinuous fibers dispersed within a thermoplastic resin. The thermoplastic resin is preferably selected from polyolefins, thermoplastic polyolefin blends, polyvinyl polymers, diene polymers, polyamides, polyesters, polycarbonates, polyestercarbonates, styrene-containing polymers, acrylic polymers, polyimides, polylphenylene ether, polyphenylene oxide, polyphenylenesulphide, polyethers, polyetherketones, polyacetals, polyurethanes, polybenzimodazole, and copolymers or mixtures thereof.

The fibers are preferably selected from glass fibers, carbon fibers, synthetic organic fibers, natural fibers, mineral fibers, metal and/or metalized or coated fibers, or mixtures thereof. The fibers may be selected from glass fibers, carbon fibers, polyaramid fibers, polyester fibers, nylon fibers, hemp fibers, sisal fibers, basalt fibers, steel fibers, aluminum fibers, copper fibers, zinc fibers, or mixtures thereof.

The composite sheet material preferably has a porosity between about 5% to about 95% by volume and an areal density of from about 400 g/m² to about 4000 g/m². The fiber content is preferably from about 20% to about 80% by weight of the thermoplastic resin.

As the thermoplastic resin contains dispersed fibers, the moldable composite plastic sheet of at least one embodiment of the invention may include a low density glass mat thermoplastic composite (GMT). One such mat is prepared by AZDEL, Inc. and sold under the trademark SUPERLITE® mat. Preferably, the areal density of the such a GMT is from about 400 grams per square meter of the GMT (g/m²) to about 4000 g/m², although the areal density may be less than 400 g/m² or greater than 4000 g/m² depending on the specific application needs. Preferably, the upper density should be less than about 400 g/m².

The SUPERLITE® mat is prepared using chopped glass fibers, a thermoplastic resin binder and a thermoplastic polymer film or films and or woven or non-woven fabrics made with glass fibers or thermoplastic resin fibers such as polypropylene (PP), polybutylene terephethalate (PBT), polyethylene terephthalate (PET), polycarbonate (PC), a blend of PC/PBT, or a blend of PC/PET. Generally, PP, PBT, PET, and PC/PET and PC/PBT blends are the preferred thermoplastic resins.

To produce the low density GMT, the materials and other additives are metered into a dispersing foam contained in an open top mixing tank fitted with an impeller. The foam aides in dispersing the glass fibers and thermoplastic resin binder. The dispersed mixture of glass and thermoplastics binder is pumped to a head-box located above a wire section of a paper machine via a distribution manifold. The foam, not the glass fiber or thermoplastic binder, is then removed as the dispersed mixture passes through a forming support element (e.g., a foraminous element such as a moving wire screen) using a vacuum, continuously producing a uniform, fibrous wet web. The wet web is passed through a dryer to reduce moisture content and to melt the thermoplastic resin binder. When the hot web comes out of the dryer, a multi-layer thermoplastic film is typically laminated into the web by passing the web of glass fiber, thermoplastic binder and thermoplastic polymer film or films through the nip of a set of heated rollers. A non-woven and or woven fabric layer may also be attached along with or in place of the multi-layer thermoplastic film to one side or to both sides of the web to facilitate ease of handling the glass fiber-reinforced mat.

The SUPERLITE® composite is then passed through tension rolls and continuously cut into the desired size for later forming into an end product article. Further information concerning the preparation of such GMT composites, including suitable materials used in forming such composites that may also be utilized in the present invention, may be found in a number of U.S. patents, e.g., U.S. Pat. Nos. 6,923,494; 4,978,489; 4,944,843; 4,964,935, 4,734,321; 5,053,449; 4,925,615; 5,609,966 and U.S. Patent Application Publication Nos. US 2005/0082881, US 2005/0228108, US 2005/0217932, US 2005/0215698, US 2005/0164023, and US 2005/0161865.

Natural (e.g., hemp, sisal) and/or synthetic fibers such as glass fibers, carbon fibers, organic fibers such as para- and meta-polyaramids, polyesters such as polyethylene terephthate fibers, and mineral fibers such as basalt fibers, and metal and/or metalized or coated fibers may also be used for the production (as described above) of such a mat for use in the composite sheet of the invention. Also, various amorphous or crystalline thermoplastic resins as described above may be employed such as polyesters (PET, PBT, PPT), acrylics, HDPE, polyethylene (PET), polypropylene (PP), polycarbonate (PC) or blends of PC/PBT or PC/PET and the like thermoplastic polymers without modification of the web forming process. The ratio of fibers to polymers, as well as the basic weight of the web, can be varied in order to meet the particular requirements of cost and material performance of a specific application.

The mat, preferably a low density glass mat (GMT) composite, may be desirably formed into an article by a forming technique such as compression molding or thermoforming, using air or gas pressure as an assist, if desired. Such methods are well-known and described in the literature, e.g., see U.S. Pat. Nos. 6,923,494 and 5,601,679.

Referring now to the drawing figures, there is illustrated a system, generally indicated at 10, for making a deep-drawn thermoplastic article such as a tub, generally indicated at 34 in FIG. 4 or a tub generally indicated at 34' in FIG. 6. The tub (34 or 34') may be used in the interior of an automotive vehicle.

The system 10 includes a female die, generally indicated at 14, having an article-defining cavity 28 defined by inner surfaces of the female die 14. The female die is typically positioned on a lower base member of a press (not shown). The system 10 also includes a male die, generally indicated at 12, typically mounted on a movable member of the press for forcing an inner portion 24 of a heated blank, generally included at 16, of thermoplastic material into the female die 14 in a direction 13 along a substantially vertical axis and against the inner surfaces of the cavity 28 to obtain deep-drawn material. The stamping press including the upper movable member forces the male die 12 including protrusions 26, into the female die 14 which is supported on the lower base member of the stamping press.

In one embodiment of the present invention, the method includes placing or positioning a previously heated (in a range of approximately 320° F. (i.e. HDPE) to approximately 570° F. (i.e. PET)) blank 30 of moldable, composite plastic sheet material over the cavity 28 of the female die 14. If polypropylene, the temperature is approximately 400° F. The blank 16 has a predefined position and orientation over the cavity 28. Outer peripheral portions 22 of the blank 16 may be perforated at holes 32 (FIG. 4) to enable the blank to be held at posts 18 which extend upwardly through the holes 32 from the outer surface of the female die 14. The posts 18 are removably positioned on the upper surface of the female die 14 to form different patterns or clusters of posts depending on the size and shape of the desired article. In this way, the holding forces at the outer peripheral particles of the heated blank can be varied so that the heated blank stretches but does not wrinkle, tear or rip during the deep-drawn process. Also, spring-loaded angled clamps 20 extend upwardly from the upper surface of the female die 14 to controllably hold outer peripheral portions 22 of the blank 16 as shown in FIGS. 2 and 3. The posts 18 and the clamps 20 may be removable or retractable to vary the positions and/or locations at which the outer peripheral portions 22 of the blank 16 are held based on the size and shape of the formed article 34.

The inner portion 24 of the heated blank 16 is forced into the cavity 28 of the female die 14 along the substantially vertical axis and against the inner surfaces of the female die 14 to obtain deep-drawn material. As shown in FIG. 4, the outer portions 22 of the blank 16 adjacent the cavity 28 are held by posts and clamps 20 to resist movement of the outer portions 22 towards the article-defining cavity 28 during the step of forcing so that the deep-drawn material controllably stretches but does not wrinkle, rip or tear during the step of forcing.

Then the male die 12 is refracted in direction 15 along the vertical axis, deep-drawn material is removed from the female die 14 and any excess material (which typically includes the holes 32) from the periphery of the deep-drawn material is removed to form the deep-drawn article 34 or 34' having a rim 30.

The step of holding is preferably performed with holding forces which increase during the step of forcing by the spring-loaded clamps 20.

The holding forces are preferably applied on the blank 16 outside of the cavity 28. For example, a first holding force is initially applied to the blank 16 to allow the inner portion 24 of the blank 16 to travel into the cavity 28 and a second holding force larger than the first biasing force is later applied on the blank 16 outside of the cavity 28 as the inner portion 24 of the blank 16 travels into the cavity 28 (because of the springs).

The step of holding is preferably performed at plurality of spaced, outer peripheral portions 22 of the blank 16 adjacent the female die 14.

The step of forcing is preferably performed in a single stamping stage.

The bottom and side walls of the deep-drawn article 34 or 34' preferably have a thickness in a range of 1 mm to 5 mm.

Figure 7:
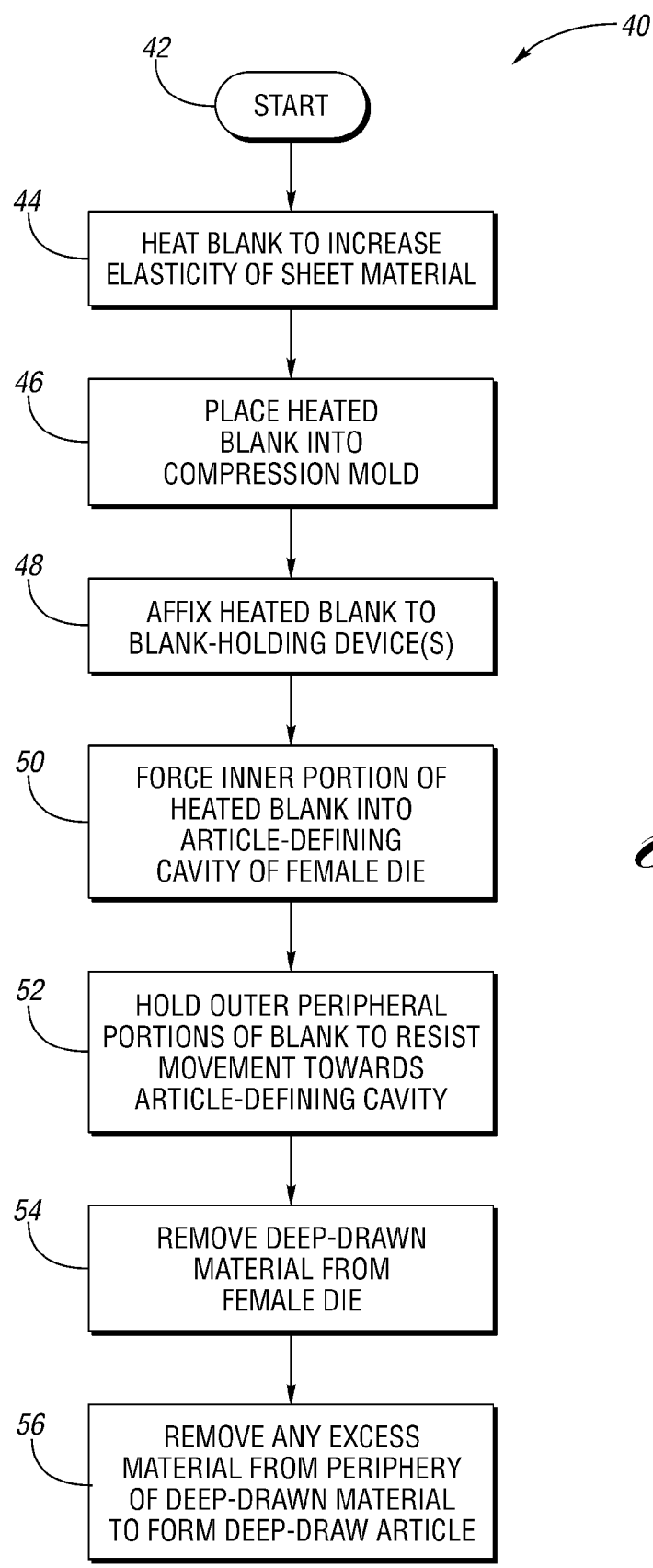
FIG. 7 is a block diagram flow chart showing various method steps to perform at least one example method embodiment of the present invention.

Referring now to FIG. 7, there is illustrated in block diagram, flow chart form an example method, generally initiated at 40, of molding composite plastic sheet material such as the heated blank 16. Blocks 42-56 illustrate the various steps to form a compression molded, deep-drawn article.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of molding composite plastic sheet material to form a compression molded, deep-drawn article, the method comprising:
    placing a heated blank of moldable, composite plastic sheet material over a female die having an article-defining cavity defined by inner surfaces of the female die so that the heated blank has a predetermined position and orientation over the article-defining cavity;
    forcing an inner portion of the heated blank into the article-defining cavity of the female die along a substantially vertical axis and against the inner surfaces of the female die to obtain deep-drawn material;
    controllably holding outer peripheral portions of the blank adjacent the article-defining cavity with corresponding predetermined holding forces obtained by selective placement of holding devices on the outer peripheral portions of the blank based on the size and shape of the article to resist movement of the outer peripheral portions towards the article-defining cavity during the step of forcing, wherein the deep-drawn material and the outer peripheral portions are controllably stretched during the step of forcing without wrinkling, tearing or ripping;
    removing the deep-drawn material from the female die; and
    removing any excess material from the periphery of the deep-drawn material to form the deep-drawn article.

2. The method as claimed in claim 1, wherein the step of holding is performed with variable holding forces which increase during the step of forcing.

3. The method as claimed in claim 2, wherein the holding forces are applied on the blank outside of the cavity so that a first holding force is initially applied to a first outer peripheral portion to allow the inner portion of the blank to travel into the cavity and a second holding force larger than the first holding force is later applied on the first outer peripheral portion of the blank outside of the cavity as the inner portion of the blank travels into the cavity.

4. The method as claimed in claim 1, wherein the step of holding is performed at a plurality of spaced, outer peripheral portions of the blank adjacent the article-defining cavity.

5. The method as claimed in claim 1, wherein the step of forcing is performed in a single stamping stage.

6. The method as claimed in claim 1, wherein the composite plastic sheet material comprises a plurality of discontinuous fibers dispersed within a thermoplastic resin.

7. The method as claimed in claim 6, wherein the thermoplastic resin is selected from polyolefins, thermoplastic polyolefin blends, polyvinyl polymers, diene polymers, polyamides, polyesters, polycarbonates, polyestercarbonates, styrene-containing polymers, acrylic polymers, polyimides, polylphenylene ether, polyphenylene oxide, polyphenylenesulphide, polyethers, polyetherketones, polyacetals, polyurethanes, polybenzimidazole, and copolymers or mixtures thereof.

8. The method as claimed in claim 6, wherein the fibers are selected from glass fibers, carbon fibers, synthetic organic fibers, natural fibers, mineral fibers, metal and/or metalized or coated fibers, or mixtures thereof.

9. The method as claimed in claim 6, wherein the fibers are selected from glass fibers, carbon fibers, polyaramid fibers, polyester fibers, nylon fibers, hemp fibers, sisal fibers, basalt fibers, steel fibers, aluminum fibers, copper fibers, zinc fibers, or mixtures thereof.

10. The method as claimed in claim 1, wherein the composite sheet material has a porosity between about 5% to about 95% by volume and an areal density of from about 400 $g/m^2$ to about 4000 $g/m^2$.

11. The method as claimed in claim 6, wherein the fiber content is from about 20% to about 80% by weight of the thermoplastic resin.

12. The method as claimed in claim 1, wherein bottom and side walls of the article have a thickness in a range of 1 mm to 5 mm.

13. A method of molding porous, reinforced, composite thermoplastic sheet material to form a compression molded, deep-drawn automotive article, the method comprising:
    placing a heated blank of moldable, reinforced, composite thermoplastic sheet material over a female die having an article-defining cavity defined by inner surfaces of the female die so that the heated blank has a predetermined position and orientation over the article-defining cavity;
    forcing an inner portion of the heated blank into the article-defining cavity of the female die along a substantially vertical axis and against the inner surfaces of the female die to obtain deep-drawn material;

controllably holding outer peripheral portions of the blank adjacent the article-defining cavity with corresponding predetermined holding forces obtained by selective placement of holding devices on the outer peripheral portions of the blank based on size and shape of the article to resist movement of the outer peripheral portions towards the article-defining cavity during the step of forcing wherein the deep-drawn material and the outer peripheral portions are controllably stretched during the step of forcing without wrinkling, tearing or ripping;

removing the deep-drawn material from the female die; and removing any excess material from the periphery of the drawn material to form the drawn automotive article.

14. The method as claimed in claim 13, wherein the step of holding is performed with variable holding forces which increase during the step of forcing.

15. The method as claimed in claim 14, wherein the variable holding forces are applied on the blank outside of the cavity so that a first holding force is initially applied to a first outer peripheral portion of the blank to allow the inner portion of the blank to travel into the cavity and a second holding force larger than the first holding force is later applied on the first outer peripheral portion of the blank outside of the cavity as the inner portion of the blank travels into the cavity.

16. The method as claimed in claim 13, wherein the step of holding is performed at a plurality of spaced, outer peripheral portions of the blank adjacent the article-defining cavity.

17. The method as claimed in claim 13, wherein the step of forcing is performed in a single stamping stage.

18. The method as claimed in claim 13, wherein the thermoplastic composite sheet material comprises a plurality of discontinuous fibers dispersed within a thermoplastic resin.

19. The method as claimed in claim 18, wherein the thermoplastic resin is selected from polyolefins, thermoplastic polyolefin blends, polyvinyl polymers, diene polymers, polyamides, polyesters, polycarbonates, polyestercarbonates, styrene-containing polymers, acrylic polymers, polyimides, polylphenylene ether, polyphenylene oxide, polyphenylenesulphide, polyethers, polyetherketones, polyacetals, polyurethanes, polybenzimidazole, and copolymers or mixtures thereof.

20. The method as claimed in claim 18, wherein the fibers are selected from glass fibers, carbon fibers, synthetic organic fibers, natural fibers, mineral fibers, metal and/or metalized or coated fibers, or mixtures thereof.

21. The method as claimed in claim 18, wherein the fibers are selected from glass fibers, carbon fibers, polyaramid fibers, polyester fibers, nylon fibers, hemp fibers, sisal fibers, basalt fibers, steel fibers, aluminum fibers, copper fibers, zinc fibers, or mixtures thereof.

22. The method as claimed in claim 13, wherein the composite sheet material has a porosity between about 5% to about 95% by volume and an areal density of from about 400 $g/m^2$ to about 4000 $g/m^2$.

23. The method as claimed in claim 18, wherein the fiber content is from about 20% to about 80% by weight of the thermoplastic resin.

24. The method as claimed in claim 13, wherein bottom and side walls of the automotive article have a thickness in a range of 1 mm to 5 mm.

25. The method as claimed in claim 1 wherein the holding devices include posts removably positioned on the upper surface of the female die that are received in complementary perforations in the outer peripheral portions of the blank.

26. The method as claimed in claim 1 wherein the holding devices include spring-loaded clamps removably positioned on the upper surface of the female die.

27. The method as claimed in claim 2 wherein the variable holding forces which increase during the step of forcing are obtained by selective placement of spring-loaded clamps removably positioned on the upper surface of the female die.

* * * * *